Dec. 11, 1951  J. A. THIERRY  2,577,826
OPERATING MECHANISM FOR MATERIAL-HANDLING MACHINES
Filed Dec. 23, 1948  2 SHEETS—SHEET 1

JOHN ADAMS THIERRY,
INVENTOR,

BY Roger Sherman Hoar

ATTORNEY.

Dec. 11, 1951    J. A. THIERRY    2,577,826
OPERATING MECHANISM FOR MATERIAL-HANDLING MACHINES
Filed Dec. 23, 1948    2 SHEETS—SHEET 2

JOHN ADAMS THIERRY,
INVENTOR,

BY

ATTORNEY.

Patented Dec. 11, 1951

2,577,826

UNITED STATES PATENT OFFICE 2,577,826

OPERATING MECHANISM FOR MATERIAL-HANDLING MACHINES

John Adams Thierry, South Milwaukee, Wis., assignor to Bucyrus-Erie Company, South Milwaukee, Wis., a corporation of Delaware Application December 23, 1948, Serial No. 66,984

4 Claims. (Cl. 214—140)

My invention relates to new and useful improvements in tractor-mounted material-handling implements, more particularly to the means for raising and lowering the supporting frame of such implements.

The principal object of my invention is to provide a toggle joint for raising and lowering the implement frame such that a maximum force will be applied to the implement frame when the frame is in lowered or in digging position, which is the position in the operating cycle where such a force is most desired.

A further object is to arrange the raising and lowering means so that only a short operating stroke is required to operate it.

A further object is to provide a raising and lowering means that will not expose the operator to jackknifing parts.

In addition to the objects above stated, I have worked out a number of novel and useful details, which will be readily evident as the description progresses.

My invention consists in the novel parts, and in the combination and arrangement thereof, which are defined in the appended claims, and of which one embodiment is exemplified in the accompanying drawings, which are hereinafter particularly described and explained.

Throughout the description, the same reference number is applied to the same member or to similar members.

Referring now to the accompanying drawings, it will be seen that:

Figure 1:
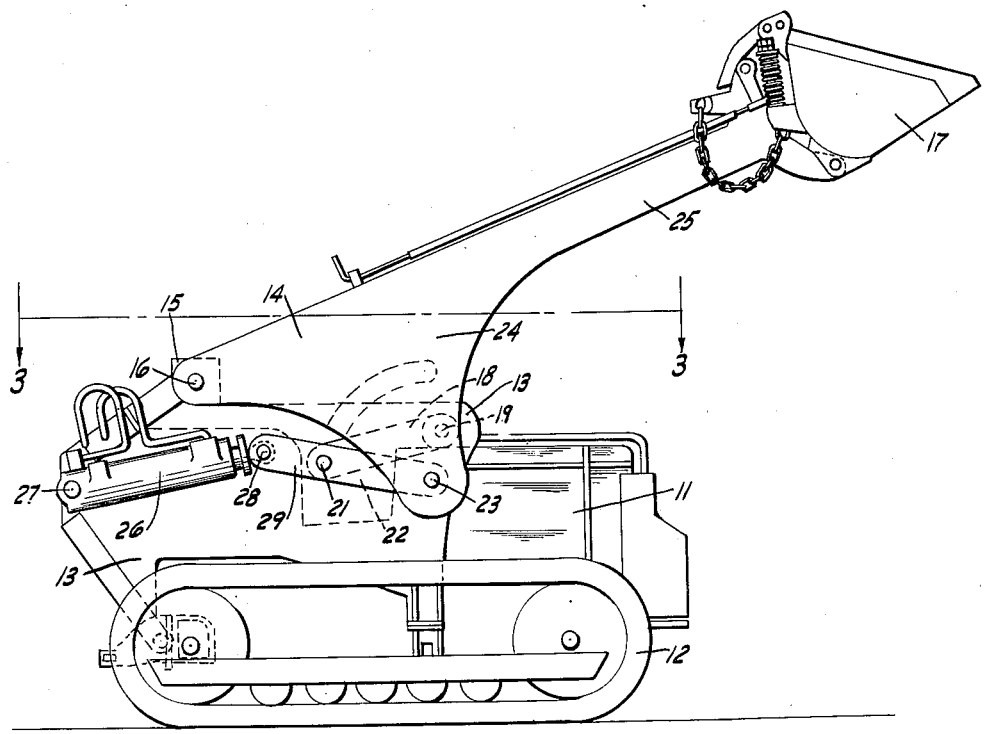
Figure 1 is a side elevation of my invention in the form of a tractor shovel on a track-type tractor with the dipper in raised position.

Referring now to the figures, we see that 11 represents a conventional tractor having creeping traction units 12, and a cradle frame 13 on which an implement frame can be mounted without overstressing the main frame of the tractor. These details of the tractor are well known and form no part of the invention. Henceforth when I refer to the "tractor" I mean thereby not only the tractor proper but also its cradle frame, if any.

At a high rearward point on cradle frame 13, an implement frame 14 is pivotally mounted in bearings 15 which carry cross shaft 16 that rigidly connects the rear ends of the implement frame. A conventional dumpable dipper 17 is pivotally supported at the forward end of the implement frame.

At a high forward point on cradle frame 13, a pair of rigid members 18 rigidly connected by cross shaft 19 are pivotally mounted in bearings 20 on the cradle frame. Remote from cross shaft 19, these members 18 are pivotally connected at 21 to a second pair of rigid members 22, which are pivotally connected at their lower end 23 to depending plates 24 of the side arms 25 of the implement frame 14. Members 18 and 22 are thus jointed together at pivots 21 to form a pair of "toggle joints." Each toggle joint is actuated by a hydraulic cylinder-piston assembly 26 which is pivotally mounted at one end at 27 on the rear end of the tractor and is pivotally connected at the other end to the toggle joint, preferably at pivot 28, on the projecting lever arm 29 of member 22.

Figure 2:
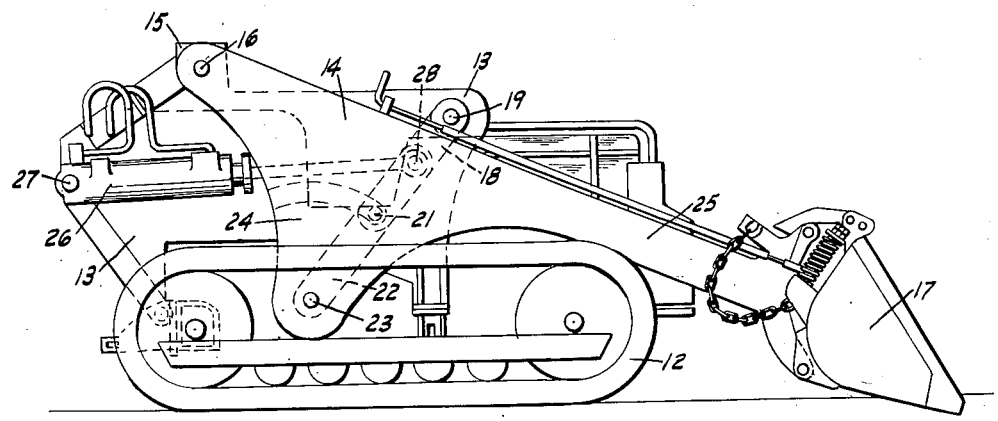
Figure 2 is a side elevation of this tractor shovel with the dipper in lowered or digging position.
Figure 3:
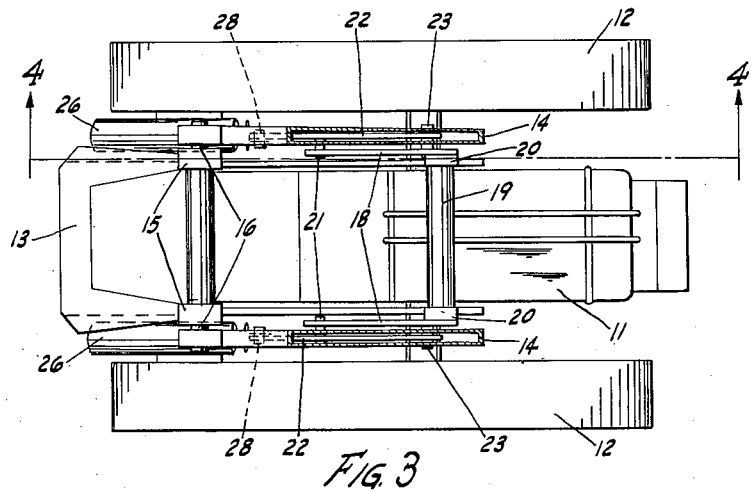
Figure 3 is a plan view, partly in section taken along the line 3—3 of Figure 1.
Figure 4:
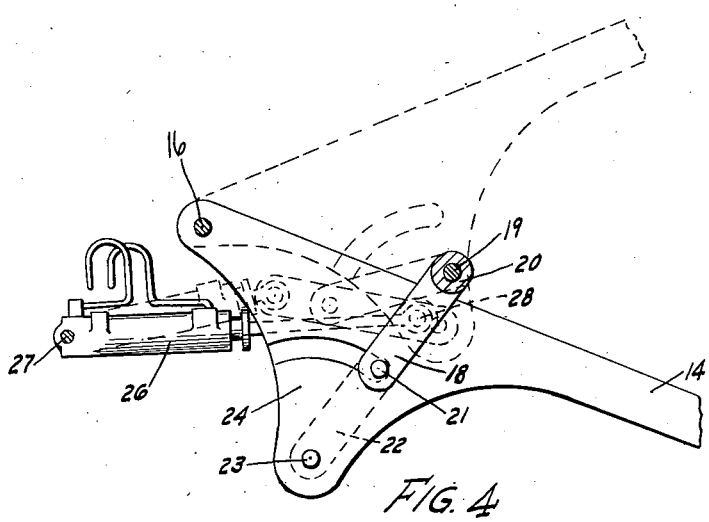
Figure 4 is a side elevation, taken along the line 4—4 of Figure 3, showing the toggle linkage and cylinder-piston assembly in lowered position (full lines) and in raised position (broken lines).

It will be seen that when the implement frame 14 is in lowered position (Figure 2) the members 18 and 22 are approximately aligned end-to-end so that they are "in toggle" and the force imposed on the implement frame 14 by cylinder-piston assemblies 26 is a maximum (in fact nearly infinite) in this position where such force is most desired for satisfactory digging. When the implement frame has cleared the ground and is in raised position (Figure 1) the members 18 and 22 of the toggle joint have jackknifed, so that movement of the frame is rapid and the force applied is relatively small. It will be noted, however, that even in raised position the cylinder-piston assemblies 26 can exert a considerable force on the implement frame, due to lever action through member 22 which pivots about the now relatively stationary toggle pivot 21 as a fulcrum. A further advantage of this arrangement is the relatively short piston stroke required to raise and lower the implement frame, this being obtained by actuating the toggle joint inwardly toward the center 19 of the arc described by pivot 23 on implement frame 14, rather than outwardly away from the center of this arc.

Having now described one form of my invention, I wish it to be understood that my invention is not to be limited to the specific form or arrangement of parts herein described or shown.

I claim:
1. In a material-handling machine, the combination of: a tractor; an implement frame and a material-handling implement attached thereto, said implement frame being pivotally connected near the rear thereof to the tractor to rotate about a horizontal transverse axis, and being raised and lowered about said axis by the following-described mechanism; a first member pivotally connected to the tractor to rotate about a horizontal transverse axis located a fixed distance forwardly of the pivot axis of the implement frame; a second member, pivotally connected to the implement frame to rotate about a transverse axis located a fixed distance intermediate the pivot axis of the implement frame and the implement and appreciably below a line between the pivot axis of the implement frame and the bottom of the implement, and pivotally connected to the first member to form a toggle joint; power-actuated means operatively connected to the toggle joint formed by said members to move the toggle axis thereof from an in-toggle position, in which the toggle axis is located approximately on a line between the pivots of said first and second members on the tractor and implement frame respectively and in which the implement frame is in lowered position, rearwardly to an out-of-toggle position, in which the toggle axis is located intermediate the pivot axis of the implement frame on the tractor and said toggle axis in its initial in-toggle position and in which the implement frame is in raised position; the pivot of the second member on the implement frame moving forwardly as said toggle axis moves rearwardly, thereby off-setting some of the rearward movement and effectively diminishing the travel of said toggle axis relative to the tractor.

2. A material-handling machine according to claim 1, further characterized by the fact that the second member is actuated by said power-actuated means to pivot in the same sense as the implement frame into and out of toggle position when the implement frame is respectively lowered and raised.

3. A material-handling machine according to claim 1, further characterized by the fact that the power-actuated means comprises a cylinder-piston assembly which is pivotally mounted on the tractor below the pivot axis of the implement frame on the tractor and is pivotally connected to said toggle joint at a point on one of said members more remote than the toggle axis from the pivot axis of that member, whereby the pivot axis of the second member on the implement frame is actuated to move across and above the line between the pivot of the implement frame on the tractor and the toggle axis when the implement frame is moved into raised position.

4. In a material-handling machine, the combination of: a tractor; an implement frame and a material-handling implement attached thereto, said implement frame being pivotally connected near the rear thereof to the tractor to rotate about a horizontal transverse axis, and being raised and lowered about said axis by the following-described mechanism; a first member pivotally connected to the tractor to rotate about a horizontal transverse axis located a fixed distance forwardly of the pivot axis of the implement frame; a second member pivotally connected to the implement frame to rotate about a transverse axis located a fixed distance intermediate the pivot axis of the implement frame and the implement, and pivotally connected to the first member to form a toggle joint; power-actuated means operatively connected to the toggle joint formed by said members to move the toggle axis thereof from an approximately in-toggle position, in which the toggle axis is located approximately on a line between the pivots of said first and second members on the tractor and implement frame respectively and in which the implement frame is in lowered position, to an out-of-toggle position, in which the toggle axis is located inside the arc travelled by the pivot of the second member on the implement frame and in which the implement frame is in raised position; the pivot of the second member on the implement frame moving upwardly along said arc as the toggle axis moves inwardly of said arc, the movements of the last-mentioned pivot and of the toggle axis thereby offsetting each other in part to diminish the travel of said toggle axis relative to the tractor.

JOHN ADAMS THIERRY.

REFERENCES CITED

The following references are of record in the file of this patent:

UNITED STATES PATENTS

| Number | Name | Date |
|---|---|---|
| 923,454 | Stearns | June 1, 1909 |
| 2,269,308 | Gates et al. | Jan. 6, 1942 |
| 2,328,715 | Drott | Sept. 7, 1943 |
| 2,332,742 | Mott | Oct. 26, 1943 |
| 2,391,224 | Carter | Dec. 18, 1945 |
| 2,480,916 | Gibson | Sept. 6, 1949 |
| 2,482,612 | Drott et al. | Sept. 20, 1949 |